(12) United States Patent
Okita et al.

(10) Patent No.: US 8,067,918 B2
(45) Date of Patent: Nov. 29, 2011

(54) SERVOMOTOR CONTROLLER FOR CONTROLLING PERIODIC RECIPROCATION

(75) Inventors: Tadashi Okita, Yamanashi (JP); Yukio Toyozawa, Yamanashi (JP); Naoto Sonoda, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 12/762,781

(22) Filed: Apr. 19, 2010

(65) Prior Publication Data

US 2010/0295496 A1 Nov. 25, 2010

(30) Foreign Application Priority Data

May 21, 2009 (JP) .................................. 2009-123381

(51) Int. Cl.
*G05B 11/32* (2006.01)
(52) U.S. Cl. ........................................ 318/625; 318/632
(58) Field of Classification Search .................. 318/625, 318/798, 799, 632, 638
See application file for complete search history.

(56) References Cited

U.S. PATENT DOCUMENTS

| 6,365,075 B1 * | 4/2002 | Kamiguchi et al. ......... 264/40.3 |
| 6,591,219 B1 * | 7/2003 | Iisaka ............................ 702/152 |
| 7,183,739 B2 * | 2/2007 | Iwashita et al. ............... 318/625 |
| 2005/0218544 A1 * | 10/2005 | Hakoda et al. ............... 264/40.5 |
| 2007/0007926 A1 * | 1/2007 | Iwashita et al. ............... 318/625 |

FOREIGN PATENT DOCUMENTS

JP 2004-280772 10/2004
* cited by examiner

*Primary Examiner* — Rina Duda
(74) *Attorney, Agent, or Firm* — Lowe Hauptman Ham & Berner LLP

(57) ABSTRACT

A servomotor controller capable of properly generating reference positions, by which learning control of angle based method may be applied to the periodically reciprocating motion of an object. The learning controller obtains a first positional deviation of a driven object at every predetermined sampling period of time, and the first positional deviation is converted, by a first converting part, to a second positional deviation associated with each reference position in one periodic reciprocating motion of the driven object. After a first correction amount of an immediately previous reciprocating motion of the driven object, stored in a memory, is added to the second positional deviation, the second positional deviation is stored in the memory as a renewed first correction amount. The first correction amount is converted to a second correction amount associated with the sampling period, by a second converting part.

6 Claims, 6 Drawing Sheets

SERVOMOTOR CONTROLLER FOR CONTROLLING PERIODIC RECIPROCATION

RELATED APPLICATIONS

The present application claims priority from Japanese Patent Application No. 2009-123381, filed on May 21, 2009, the entire contents of which are fully incorporated herein by reference.

BACKGROUND OF THE INVENTION

1. Field of the Invention

The present invention relates to a servomotor controller for controlling the motion of a driven object which performs a periodic reciprocation, in particular, to a servomotor controller adapted to be used in learning control of angle based method.

2. Description of the Related Art

Learning control is a method for minimizing a control deviation by using a periodic motion. Learning control includes two types, i.e., time based method, wherein the period of time of the periodic motion is determined and a correction amount is calculated at each time period in a learning controller; and angle based method, wherein an amount of movement the periodic motion in one time period is determined and a correction amount at reference positions obtained by dividing the amount of movement. As an application to which learning control of angle based method may be applied, dress processing for a gear cutting machine, oscillation motion for a grinding machine, and inversion control for a servo press machine may be used.

For example, Japanese Unexamined Patent Publication (Kokai) No. 2004-280772 discloses a servomotor drive controller, to which learning control may be effectively applied even when the speed of the servomotor is varied, by storing correction data corresponding to the position of a repetitive commanded pattern and correcting a positional deviation corresponding the position.

In learning control of time based method, the period of time needs to be precisely determined. Therefore, a special programming method is necessary in order to use learning control of time based method. For example, in one programming method, when repetitive motion is to be performed, a command to be generated at a certain time in one period is previously prepared as a table. In such a programming method, the function of a general ISO code (G-code), such as polar coordinate conversion, cannot be used. In the above application, programming with the general ISO code is performed. Therefore, the precise repetitive performance cannot be always realized, whereby learning control of time based method is difficult.

On the other hand, learning control of angle based method does not need to determine the precise period of time, as long as the reference position is given, and therefore angle based method is easier to use than time based method. However, learning control of angle based method can be used only when the reference position varies in one direction (or monotonically varies). In other words, angle based method cannot be used when the reference position varies corresponding to the reciprocating motion. For example, when a driven object reciprocates, the object passes through the same position during the outward motion and return motion. However, the polarity of a generated servo deviation is varied depending on the direction of movement of the object. Therefore, a correction amount generated in the outward motion cannot be used in the return motion, and thus it is necessary to separately calculate a correction amount for the return motion.

In order to solve the problem, Japanese Unexamined Patent Publication (Kokai) No. 2004-280772 discloses a technique wherein different memory sets are prepared depending on the direction of movement of an object, and the memory sets are properly switched so that the learning control of angle based method may be used in controlling the reciprocating motion of the object. Generally, a correction amount calculating part of a learning controller prefetches the memory in order to compensate a delay in a control system. However, in the invention of Japanese Unexamined Patent Publication (Kokai) No. 2004-280772, the memory sets are switched depending on the speed of the object, whereby the memory set in the outward motion and the memory set in the return motion cannot be continuously connected to each other. As a result, a large deviation may be generated when switching the memory sets.

SUMMARY OF THE INVENTION

An object of the present invention is to provide a servomotor controller capable of properly generating reference positions, by which learning control of angle based method may be applied periodically to reciprocating motion of an object.

According to one aspect of the present invention, there is provided a servomotor controller for controlling a servomotor adapted to perform periodic reciprocating motion of a driven object, the servomotor controller comprising: a position detector adapted to detect the position of the driven object; a positional deviation obtaining part adapted to obtain a first positional deviation of the position of the driven object detected by the position detector at every predetermined sampling period of time, relative to position command given by a head controller; a reference position generating part adapted to generate a plurality of reference positions, for one reciprocating period of time of the periodic reciprocating motion of the driven object, the plurality of reference positions being varied in one direction corresponding to the position command or the detected position of the driven object; a first converting part adapted to convert the first positional deviation obtained by the positional deviation obtaining part to a second positional deviation, the second positional deviation being associated with each of the reference positions generated by the reference position generating part; a storing part adapted to store a first correction amount associated with each reference position, for one reciprocating period of time of the reciprocating motion of the driven object; an arithmetic adding part adapted to add the second positional deviation to the first correction amount stored in the storing part and to determine a renewed first correction amount for a subsequent reciprocating period of time of the reciprocating motion of the driven object; a second converting part adapted to convert the renewed first correction amount stored in the storing part to a second correction amount, the second correction amount being associated with the every predetermined sampling period of time; and a controlling part adapted to control the servomotor based on the first positional deviation and the second correction amount.

It is preferable that the reference position generating part generates the plurality of reference positions by dividing an integration value which is obtained by integrating absolute values for one reciprocating period of time, the absolute values being calculated from the sampling period of time and the position command or the position of the driven object at every sampling period of time.

The servomotor controller may further comprise a polarity inverting part adapted to invert the polarity of the first positional deviation and the second correction amount based on the polarity of the speed calculated by the sampling period of time and the position command or the position of the driven object at every sampling period of time.

The reference position generating part or the polarity inverting part may use the position of a driving object which synchronizes with the periodic reciprocating motion of the driven object, instead of using the position command or the position of the driven object.

The servomotor controller may further comprise: a first filter adapted to limit a frequency bandwidth of the renewed first correction amount obtained by adding the immediately previous first correction amount stored in the storing part to the second positional deviation converted by the first converting part; and a second filter adapted to compensate a phase and a gain of the first correction amount before the first correction amount stored in the storing part is sent to the second converting part associated with the sampling period of time.

BRIEF DESCRIPTION OF THE DRAWINGS

The above and other objects, features and advantages of the present invention will be made more apparent by the following description of the preferred embodiments thereof with reference to the accompanying drawings wherein.

DETAILED DESCRIPTION

Figure 1:
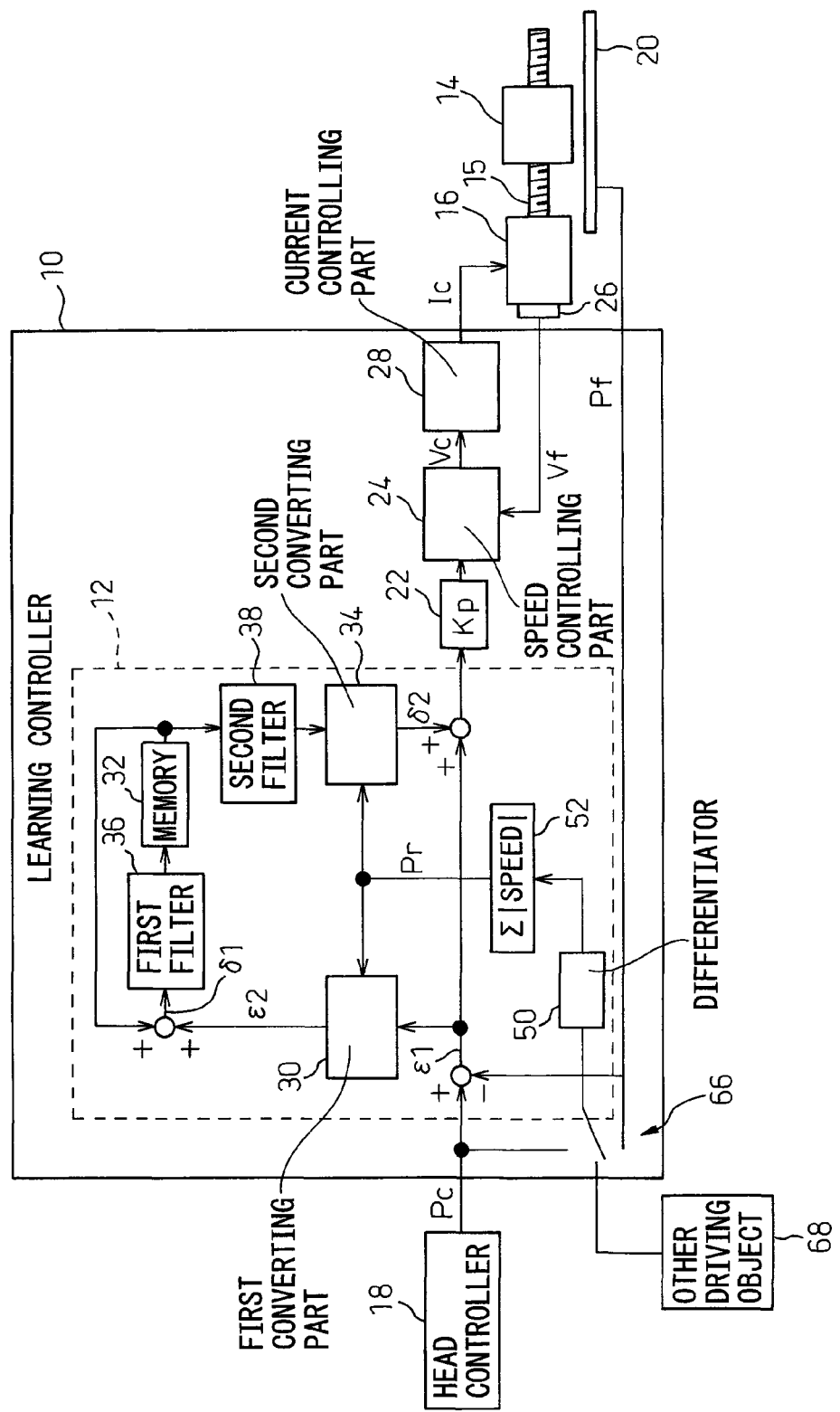
FIG. 1 shows one example of a configuration of a servomotor controller according to the present invention.

FIG. 1 shows one example of a configuration of a servomotor controller according to the present invention of the invention. A servomotor controller 10 includes a learning controller of angle based method 12 so as to control a servomotor 16 adapted to drive a driven object 14 (as described below) via a ball screw 15 or the like, such that driven object performs the periodic reciprocating motion. Learning controller 12 generates a correction amount or correction value δ2 (or a second correction amount as described below) for controlling the position of object 14 based on position command Pc from a head controller 18 and position feedback Pf from a position detector 20 adapted to detect the position of object 14. Second correction amount δ2 is sent to a speed controlling part 24 via a position gain 22, and then speed controlling part 24 generates speed command Vc based on the second correction amount and speed feedback Vf from a speed detector 26 adapted to detect the speed of servomotor 16. A current controlling part 28 generates current command Ic based on speed command Vc, and then servomotor 16 is controlled based on current command Ic.

Learning controller 12 obtains position command Pc transmitted from head controller 18 and position feedback Pf from position detector 20, and obtains the positional deviation (or a first positional deviation ε1) of driven object 14 at every sampling period of time (for example, at every 1 ms interval). First positional deviation ε1 is sent to a first converting part 30, and then first converting part 30 converts first positional deviation ε1 to a second positional deviation ε2 associated each of the reference positions in one reciprocating motion of object 14 (as described below). In other words, the first positional deviation associated with the sampling period of time is converted to the second positional deviation associated with each reference position. As a calculation technique for the conversion may be known, the detailed explanation thereof is omitted.

After an immediately previous first correction amount or correction value (or a first correction amount of an immediately previous reciprocating period of the reciprocating motion) is added to second positional deviation ε2, a value obtained as such is stored in a memory 32 as a renewed or updated first correction amount δ1. Renewed first correction amount δ1 is sent to a second converting part 34, and then second converting part 34 converts the first correction amount associated with each reference position to a second correction amount δ2 associated with the sampling period of time. In other words, the first correction amount associated with each reference position is converted to the second correction amount associated with the sampling period of time. In FIG. 1, a white circle means an adder and a black circle means a branch point. The same is also applicable to the other drawings.

Learning controller 12 may have a first filter 36 adapted to limit a frequency bandwidth of first correction amount δ1, and a second filter 38 adapted to compensate a phase and a gain of the first correction amount before the first correction amount is sent to second converting part 34. Such filters are not essential to the invention. Concretely, "a filter adapted to limit a frequency bandwidth" means a low-pass filter for cutting a signal having a relatively high frequency, whereby a control system may be stable. Further, "a filter adapted to compensate a phase and a gain" concretely means a filter for advancing a phase of a signal having a relatively high frequency and increasing a gain of the signal, whereby delay in a control system such as position, speed or current control system, and reduction of the gain in the control system may be compensated.

Hereinafter, two application examples of the invention will be explained, in particular the function of the reference position generating part adapted to generate reference positions of the driven object.

Figure 2:
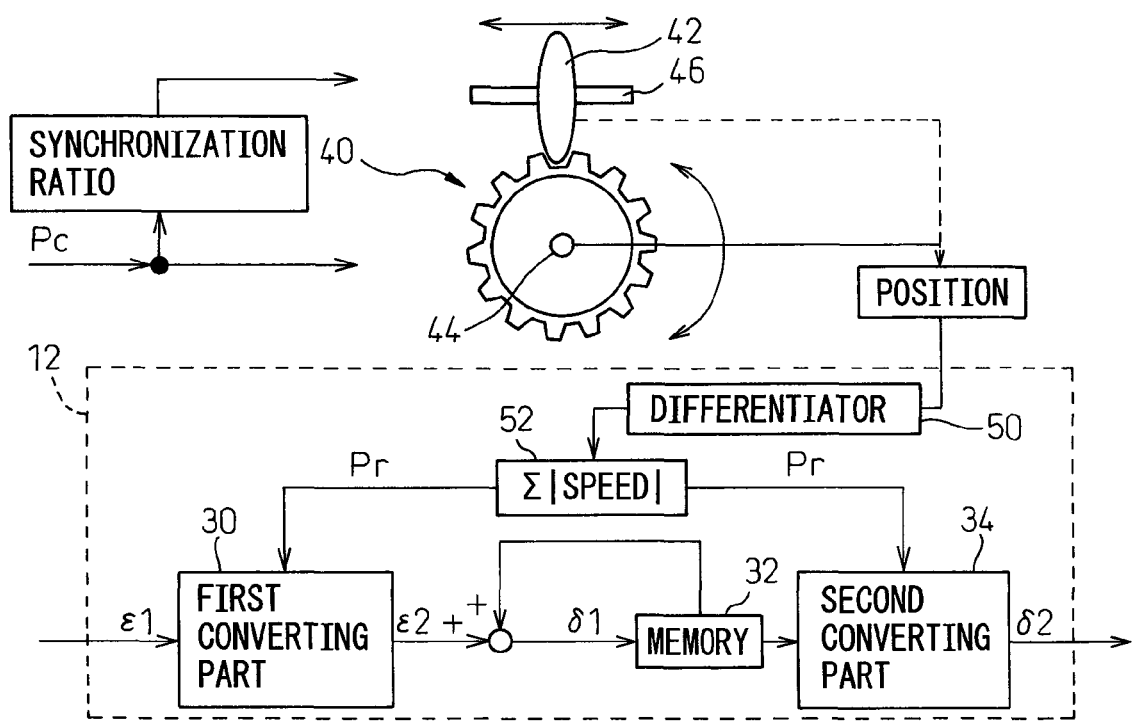
FIG. 2 shows a first application example of the invention.

FIG. 2 shows a first embodiment, wherein the invention is applied to a gear grinding machine. In the gear grinding machine, a grinding wheel 42 (or a driven object) performs the periodic reciprocating motion in synchronization with the rotational fluctuation of a gear 40 (or a workpiece), and processes each tooth of gear 40. A rotation axis 44 of gear 40 and a reciprocation axis 46 of grinding wheel 42 are controlled based on position command Pc from the head controller (not shown in FIG. 2). Rotation axis 44 of gear 40 is adapted to rotationally fluctuate gear 40 in a certain angular range (for example, 30-40 degrees) at a constant period of time. On the other hand, axis 46 of grinding wheel 42 is adapted to reciprocate grinding wheel 42 at the constant period of time.

Figure 3D:
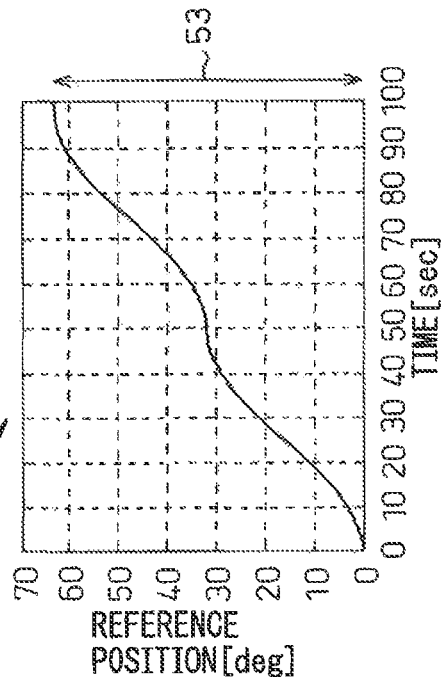
FIGS. 3a-3d show the procedure for generating a reference position in the example of FIG. 2.
Figure 3B:
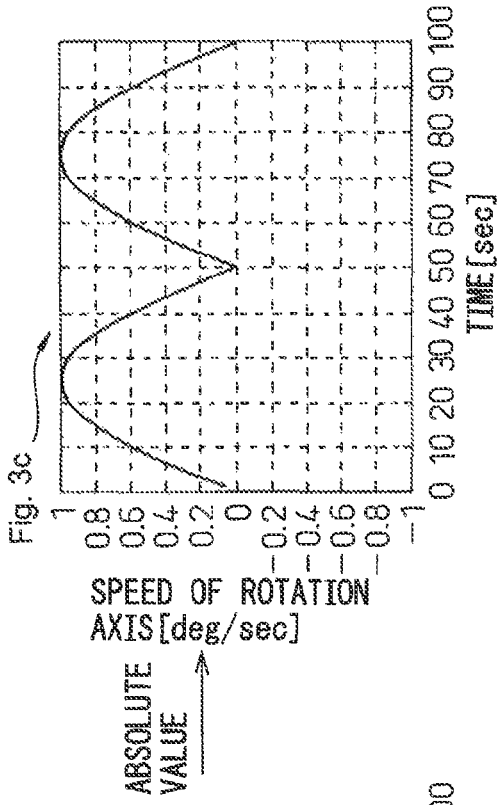
Figure 3A:
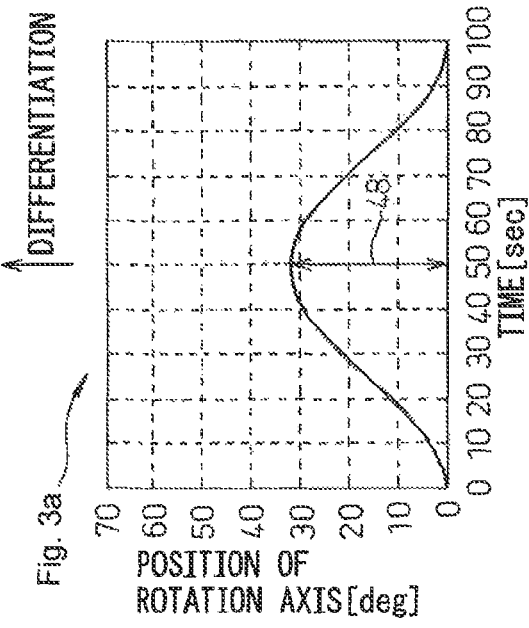
Figure 3C:
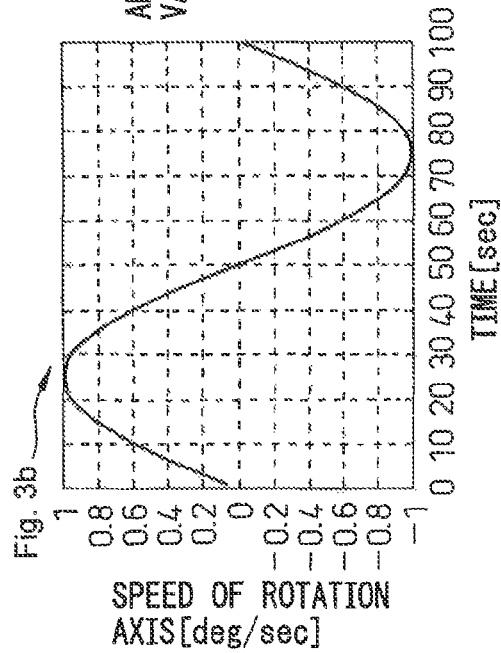

FIGS. 3a-3d show graphs for explaining the procedure to generate reference positions based on the angular position of the rotation axis of gear 40 in one fluctuation period of time. In this case, gear 40 may rotationally fluctuate as shown in FIG. 3a. As apparent from FIG. 3a, gear 40 periodically fluctuates at a predetermined period of time in a fluctuation range as indicated by arrow 48. In learning controller 12, a differentiator 50 (see FIGS. 1 and 2) differentiates the position of the rotation axis as shown in FIG. 3a. Then, the speed of the rotation axis may be obtained as shown in FIG. 3b. Since gear 40 performs the fluctuation motion, the speed of the rotation axis includes positive and negative values. Next, as shown in FIG. 3c, an integrator 52 calculates an absolute value of the speed of the rotation axis and integrates the absolute values so as to generate a reference position as shown in FIG. 3d. In the example of FIG. 3d, the reference position monotonically increases within the range as indicated by arrow 53. As such, the reference position varies in one direction (monotonically increases in this case) in one reciprocating (fluctuation) period of time, and therefore learning control of angle based method may be used in every period of time. Concretely, in the first embodiment, one fluctuation cycle of the gear (or one reciprocation cycle of the grinding wheel) is determined as one learning cycle, whereby delay of the servomotor which reciprocates the grinding wheel and periodic disturbance of machining may be corrected. In the first embodiment and a second embodiment as described below, differentiator 50 and integrator 52 cooperatively constitute the reference position generating part. In addition, data of the reference position, which is actually used, may be obtained by dividing a horizontal axis (time) of FIG. 3d (preferably, dividing it at equal intervals).

In the example of FIGS. 3a-3d, the reference position is generated by using the position of gear 40 which is not a driven object defined in the invention. However, the position of the driven object (i.e., grinding wheel 42) may be used to generate the reference position. In the first embodiment, the fluctuating motion of the gear and the reciprocating motion of the grinding wheel are synchronized, whereby the reference position similar to FIGS. 3a-3d may be obtained when the position of the grinding wheel is used.

As shown in FIG. 1 or 2, generated reference position Pr is sent to first converting part 30 and second converting part 34. As described above, first converting part 30 coverts first positional deviation $\epsilon 1$ associated with the sampling period of time to second positional deviation $\epsilon 2$ associated with each reference position. Then, the first correction amount of the immediately previous reciprocating period of time of grinding wheel 42 stored in the storing part or memory 32 is added to second positional deviation $\epsilon 2$, and second positional deviation $\epsilon 2$ is stored in memory 32 as renewed first correction amount $\delta 1$. On the other hand, second converting part 34 coverts first correction amount $\delta 1$ associated with each reference position converts to second correction amount $\delta 2$ associated with the sampling period of time. Based on first positional deviation $\epsilon 1$ and second correction amount $\delta 2$, the servomotor adapted to drive the driven object or grinding wheel 42 (reciprocation shaft 46) is controlled.

Figure 4:
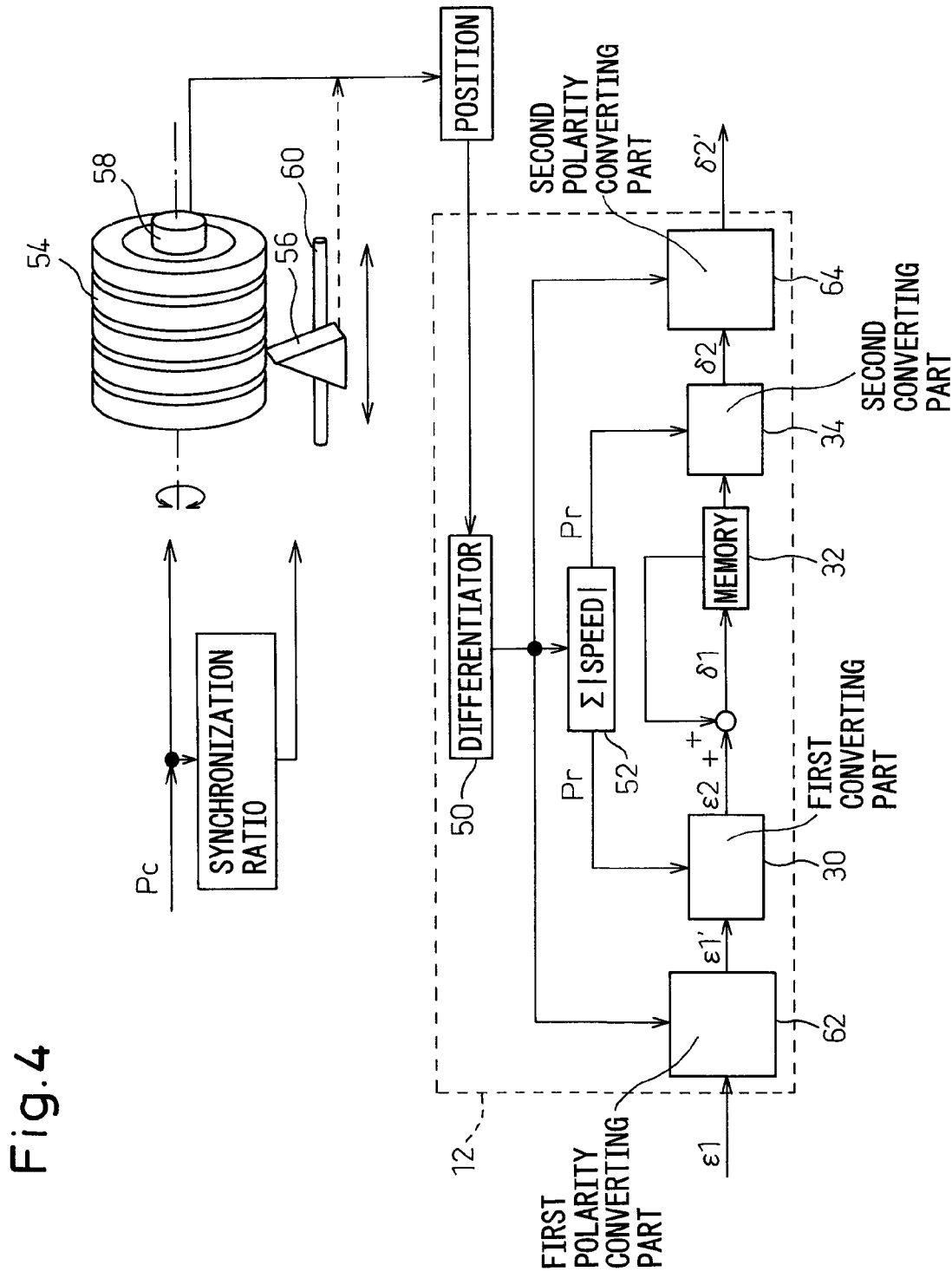
FIG. 4 shows a second application example of the invention.

FIG. 4 shows a second embodiment, wherein the invention is applied to dress control for a gear grinding machine. In the gear grinding machine, a cutter 56 (or a driven object of the invention) performs reciprocating motion in synchronization with the rotation of a rotating wheel 54 (or a workpiece) so as to process rotating wheel 54. A rotation axis 58 of wheel 54 and a feed shaft 60 of cutter 56 are controlled based on position command Pc from the head controller (not shown in FIG. 4). In this case, cutter 56 performs one reciprocating motion while rotating wheel 54 rotates twenty revolutions, and cutter 56 performs ten reciprocating motions for processing one rotating wheel. In addition, the rotational direction of rotating wheel 54 is different between the outward direction (from left to right in FIG. 4) and the return direction (from right to left in FIG. 4) of cutter 56.

FIGS. 5a-5f show graphs for explaining the procedure to generate reference positions based on the angular position of rotation axis 58 of rotating wheel 54 in twenty revolutions of wheel 54 (or in one reciprocating motion of cutter 56) fluctuation period of time. When rotating wheel 54 performs ten revolutions in the positive direction (corresponding to the outward direction of cutter 56), the angular position of rotation axis 58 is represented by a FIG. 5a, since the angular position returns to zero (from 360 degrees to zero degrees) every one revolution. However, since rotating wheel 54 rotates in one direction in each of the outward or return movement of the cutter, the angular position may be represented by using an accumulated value as shown in a FIG. 5b (for example, the angular position in a second revolution is within 360 to 720 degrees). Then, similarly to the first embodiment, differentiator 50 of learning controller 12 differentiates the angular position indicated by the accumulated value. As a result, the speed of the rotation axis may be obtained as shown in a FIG. 5c. Next, integrator 52 calculates an absolute value of the speed of the rotation axis and integrates the absolute value so as to obtain the reference position as shown in a FIG. 5d. As apparent from FIG. 5d, the obtained reference position varies in one direction (in this case, monotonically increases in a broad sense), whereby learning control of angle based method may also be used in the second embodiment.

Figure 5:
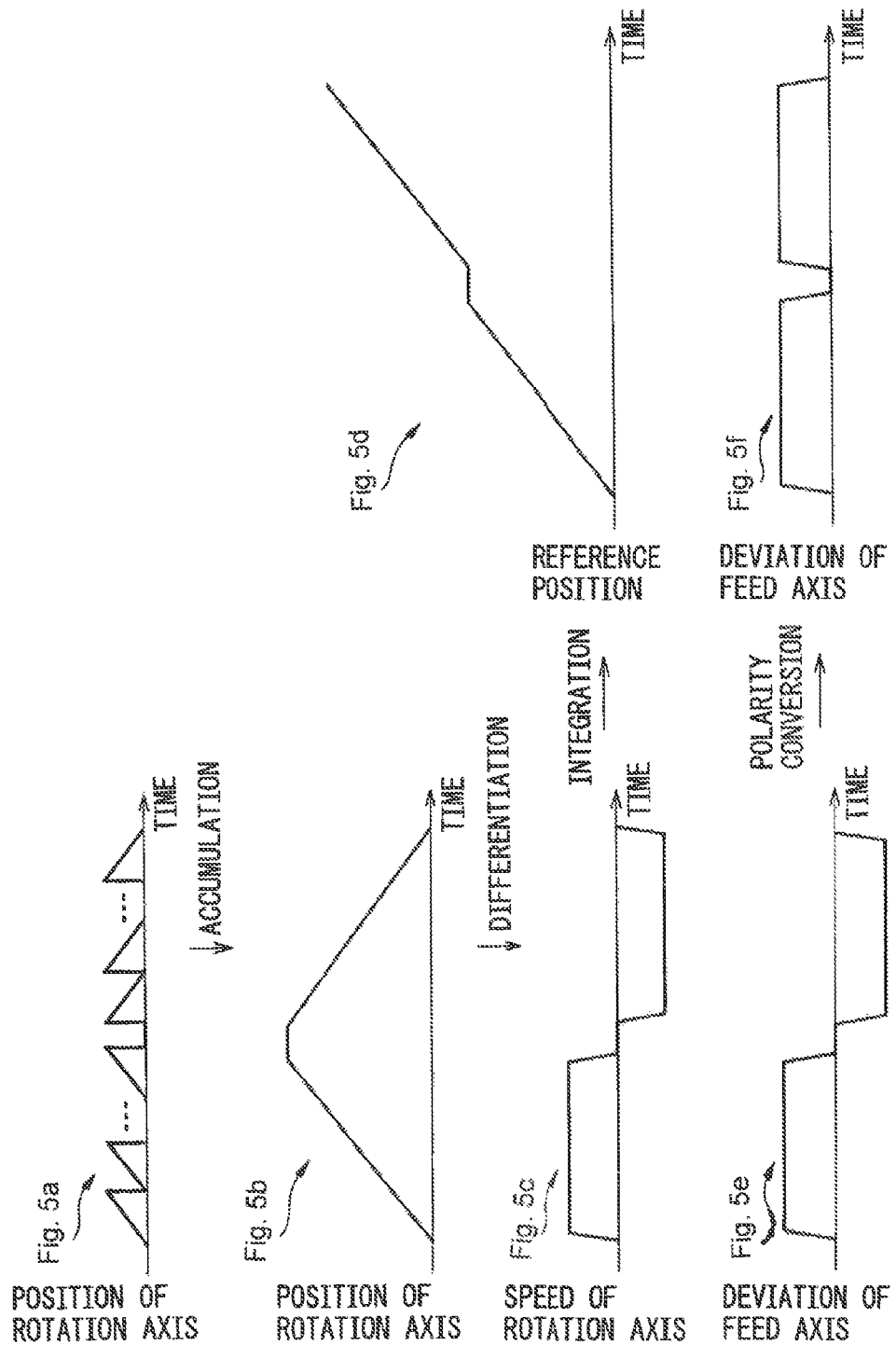
FIG. 5a-5f show the procedure for generating a reference position in the example of FIG. 4.

On the other hand, the positional deviation of feed axis 60 for reciprocating cutter 56 is basically due to delay of the servo relative to the rotation of rotating wheel 54, and therefore the positional deviation may be represented as shown in a FIG. 5e. As shown in FIG. 4, learning controller 12 may have a first polarity inverting part 62 adapted to invert the polarity (plus or minus) of positional deviation $\epsilon 1$ of feed axis 60 corresponding to the polarity of rotation shaft 58. In the second embodiment, as shown in FIG. 5c, the polarity of the rotational direction of the wheel in the latter ten revolutions is minus, and thus the polarity of the positional deviation of the feed axis corresponding to the latter ten revolutions is inverted. As a result, as shown in a FIG. 5f, the inverted positional deviation of the feed axis (indicated by "$\epsilon 1'$" in FIG. 4) may be obtained.

As shown in FIG. 4, reference position Pr generated by integrator 52 is sent to first converting part 30 and second converting part 34. First converting part 30 converts first positional deviation $\epsilon 1'$ associated with the sampling period of time to second positional deviation $\epsilon 2$ associated with each reference position. Then, the first correction amount of the immediately previous reciprocating period of time of cutter 56 stored in the storing part or memory 32 is added to second positional deviation $\epsilon 2$, and second positional deviation $\epsilon 2$ is stored in memory 32 as renewed first correction amount $\delta 1$. On the other hand, second converting part 34 coverts first correction amount $\delta 1$ associated with each reference position converts to second correction amount $\delta 2$ associated with the sampling period of time. As shown in FIG. 4, learning controller 12 may have a second polarity inverting part 64 adapted to invert the polarity (plus or minus) of second correction amount $\delta 2$ of feed shaft 60 corresponding to the polarity of rotation shaft 58 and calculate an inverted second correction amount (indicated by "$\delta 2'$" in FIG. 4). In the second embodiment, as shown in FIG. 5c, the polarity of the rotational direction of the wheel in the latter ten revolutions is minus, and thus the polarity of the second correction amount corresponding to the latter ten revolutions is inverted. Based on first positional deviation $\epsilon 1$ and inverted second correction amount $\delta 2'$, the servomotor adapted to drive the driven object or cutter 56 (feed shaft 60) is controlled.

In the second embodiment, in order to reduce disturbance in one revolution of the rotation shaft due to eccentricity of the rotating wheel, a learning control cycle is set corresponding to one revolution of the rotation shaft. In the prior art, the correction amount generated for the outward movement cannot be used for the return movement, since the polarities of them are different. In order to solve the problem, by inverting the polarity corresponding to the speed and generating the reference position using the accumulated the absolute value of the speed, the same correction amount may be used in the outward movement and the return movement. Accordingly, the procedure, wherein the deviation in learning control converges, becomes unnecessary.

In the second embodiment, the reference position is generated based on the rotational position of rotating grinding wheel 54. However, the reference position may be generated based on the position of cutter 56 or the driven object. In the second embodiment, the most important deviation in the learning control is due to the eccentricity of the rotating wheel, and such a deviation is repeated at every revolution of the rotating grinding wheel. Further, a feed amount of the cutter is determined based on the number of revolutions of the rotating grinding wheel. Therefore, in the second embodiment, it is preferable for the learning control that the reference position is generated by using the position of rotating grinding wheel 54, not of cutter 56.

As shown in FIG. 1, controller 10 may have a switcher 66 capable of switching positional data sent to differentiator 50. In other words, the positional data processed by differentiator 50 may be position data from positional detector 20 or positional data included in a positional command from head controller 18. Otherwise, the position of the other axis or a driving object 68, adapted to function in synchronization with the motion of driven object 14, may be used as the positional data. Gear 40 and rotating grinding wheel 54 as described above may correspond to the other axis or driving object 68. Switcher 66 may switch which of them is processed by differentiator 50. Needless to say, one of the detected positions, the commanded position and the position of the driving object may be used without using the switcher.

Figure 6:
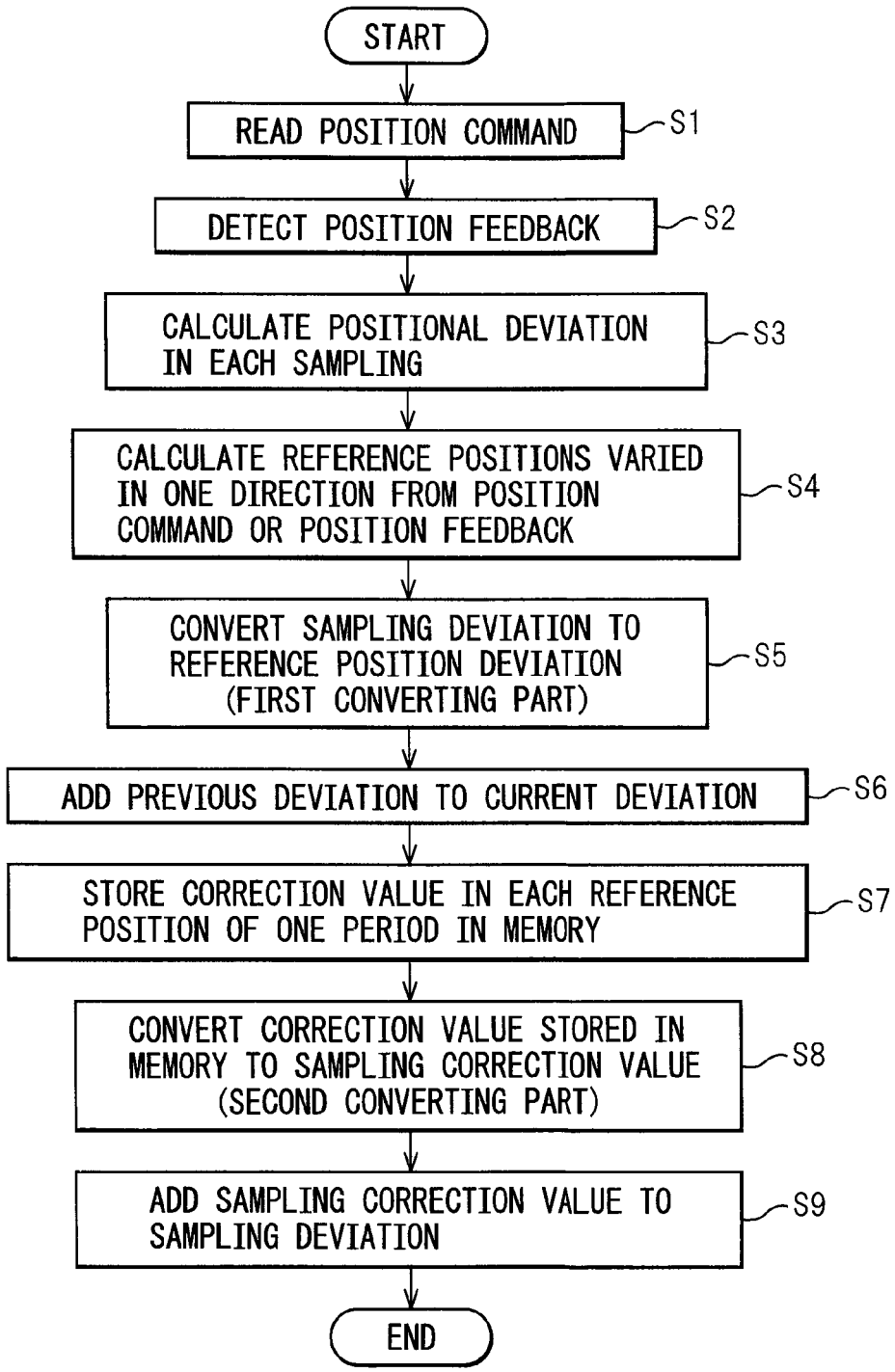
FIG. 6 is a flowchart showing the procedure in the servomotor controller of the invention.

FIG. 6 shows a flowchart of the procedure in the servomotor controller of the invention. First, in step S1, the position command from head controller 18 is read, and then the position feedback of the driven object is detected in step S2. In the next step S3, the positional deviation associated with the sampling period of time (the first positional deviation) is calculated, and then the reference position, which varies in one direction, is generated based on the position command or the position feedback in step S4. In addition, "varies in one direction" used herein includes monotonic decrease in a narrow sense or a broad sense, as well as monotonic increase in a narrow sense or a broad sense as in the above embodiment.

In the next step S5, the first positional deviation calculated in step S3 is converted to the positional deviation associated with each reference position calculated in step S4 (the second positional deviation). In the next step S6, the first correction amount calculated in the immediately previous reciprocating period is added to the second positional deviation calculated in the current period, so as to obtain renewed first correction amount. In this regard, since there is no previous first correction amount in the initial (first) reciprocating period, the second positional deviation is set to the renewed first correction amount in the first reciprocating period. The renewed correction amount is stored in the memory (step S7), and is added to the second positional deviation calculated in the next reciprocating period. In the next step S8, the correction amount associated with each reference position of the immediately previous reciprocating period stored in the memory (the first correction amount) is converted to the correction amount associated with the sampling period of time (the second correction amount). Finally, in the next step S9, the second correction amount associated with the sampling period of time is added to the first positional deviation, so as to control the servomotor.

According to the servomotor controller of the present invention, learning control of angle based method may be applied to the periodically reciprocating motion of a driven object, wherein one cycle of the learning control corresponds to one reciprocating motion of the driven object.

The preferable reference position may be obtained by accumulating the absolute value calculated from the commanded position or detected position of the driven object.

When the servomotor controller is used to control a driven object which performs the reciprocating motion corresponding to the rotational motion of another object, the same correction amount may be used in the outward and return movement of the reciprocating motion, by using a polarity inverting part capable of inverting the polarities of the first positional deviation and the second correction amount.

When generating the reference position, the commanded position or detected position of the other object, which function in synchronization with the driven object, may be used. Such a case is advantageous when the deviation to be corrected is mainly due to the motion or the shape of the other object.

By using a first filter adapted to limit a frequency bandwidth of the first correction amount and a second filter adapted to compensate a phase and a gain of the first correction amount before the first correction amount is sent to the second converting part, the learning control may be more stable.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A servomotor controller for controlling a servomotor for performing periodic reciprocating motion of a driven object, the servomotor controller comprising:
   a position detector for detecting the position of the driven object;
   a positional deviation obtaining part for obtaining a first positional deviation of the position of the driven object detected by the position detector at every predetermined sampling period of time, relative to position command given by a head controller;
   a reference position generating part for generating a plurality of reference positions, for one reciprocating period of time of the periodic reciprocating motion of the driven object, the plurality of reference positions being increased in one direction corresponding to the position command or the detected position of the driven object;
   a first converting part for converting the first positional deviation obtained by the positional deviation obtaining part to a second positional deviation, the second positional deviation being associated with each of the reference positions generated by the reference position generating part;
   an arithmetic adding part for adding the second positional deviation to a first correction amount in an immediately previous period stored in the storing part and for determining a renewed first correction amount;
   a storing part for storing the renewed first correction amount associated with each reference position, for one reciprocating period of time of the reciprocating motion of the driven object;
   a second converting part for converting the renewed first correction amount stored in the storing part to a second correction amount, the second correction amount being associated with the every predetermined sampling period of time; and a controlling part for controlling the servomotor based on the first positional deviation and the second correction amount, wherein the reference position generating part generates the plurality of reference positions by dividing an integration value which is obtained by integrating absolute speed values for one reciprocating period of time, the absolute speed values being calculated from the sampling period of time and the position command or the position of the driven object at every sampling period of time.

2. The servomotor controller as set forth in claim 1, further comprising a polarity inverting part for inverting the polarities of the first positional deviation and the second correction amount based on the polarity of the speed calculated by the sampling period of time and the position command or the position of the driven object at every sampling period of time.

3. The servomotor controller as set forth in claim 2, wherein the reference position generating part and the polarity inverting part use the position of a driving object which synchronizes with the periodic reciprocating motion of the driven object, instead of using the position command or the position of the driven object.

4. The servomotor controller as set forth in claim 1, further comprising:

a first filter for limiting a frequency bandwidth of the renewed first correction amount obtained by adding the immediately previous first correction amount stored in the storing part to the second positional deviation converted by the first converting part; and a second filter for compensating a phase and a gain of the first correction amount before the first correction amount stored in the storing part is sent to the second converting part associated with the sampling period of time.

5. The servomotor controller as set forth in claim 2, further comprising:

a first filter for limiting a frequency bandwidth of the renewed first correction amount obtained by adding the immediately previous first correction amount stored in the storing part to the second positional deviation converted by the first converting part; and a second filter for compensating a phase and a gain of the first correction amount before the first correction amount stored in the storing part is sent to the second converting part associated with the sampling period of time.

6. The servomotor controller as set forth in claim 3, further comprising:

a first filter for limiting a frequency bandwidth of the renewed first correction amount obtained by adding the immediately previous first correction amount stored in the storing part to the second positional deviation converted by the first converting part; and a second filter for compensating a phase and a gain of the first correction amount before the first correction amount stored in the storing part is sent to the second converting part associated with the sampling period of time.

* * * * *